Nov. 15, 1938.  G. H. HUFFERD  2,136,440
TRAILER HITCH
Filed March 19, 1937
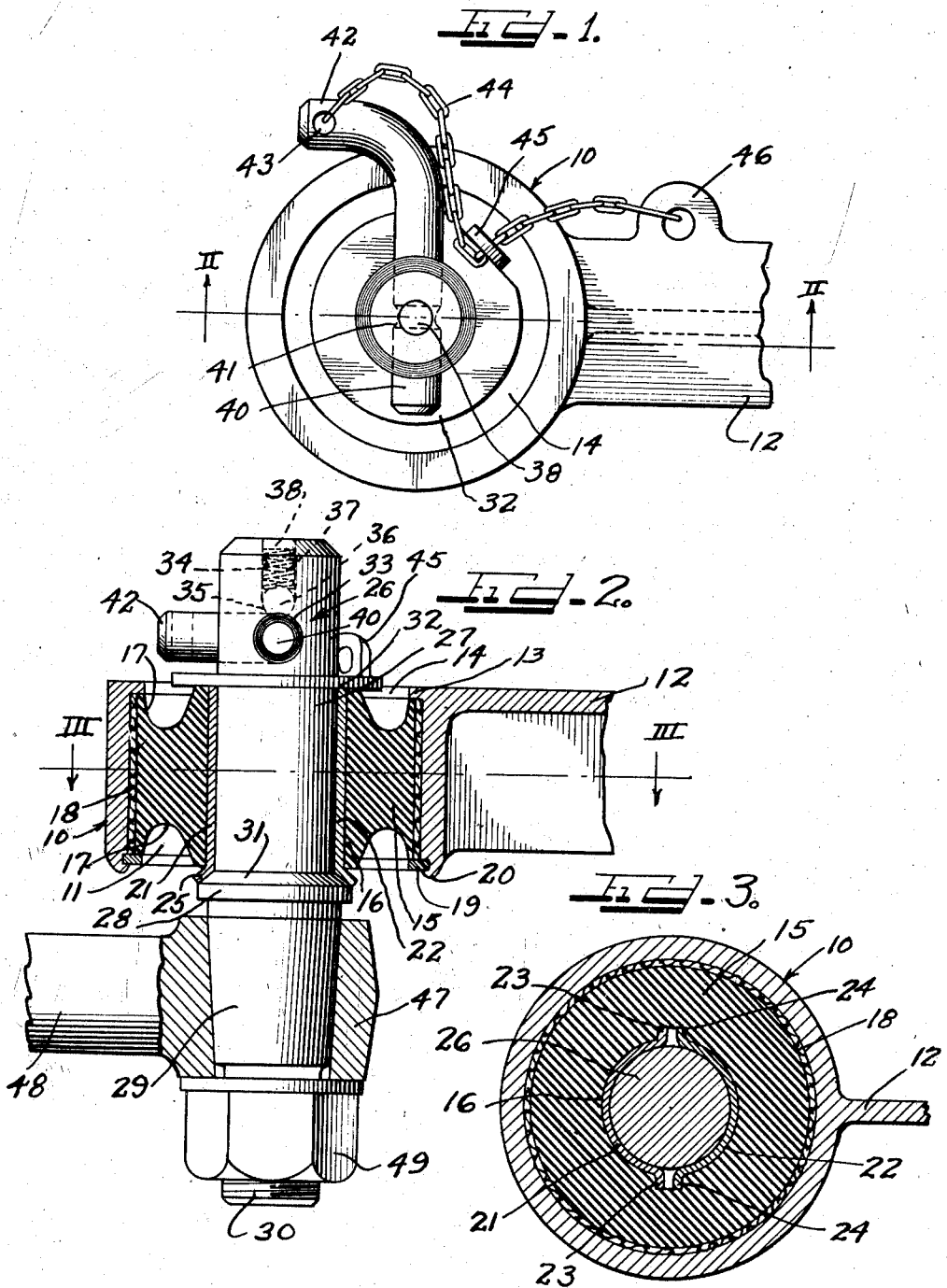
George H. Hufferd.
by Charles H. Hills Attys.

Patented Nov. 15, 1938

2,136,440

UNITED STATES PATENT OFFICE 2,136,440

TRAILER HITCH

George H. Hufferd, Detroit, Mich., assignor to Thompson Products, Incorporated, Cleveland, Ohio, a corporation of Ohio Application March 19, 1937, Serial No. 131,796

3 Claims. (Cl. 280—33.15)

This invention relates to a coupler or hitch for detachably connecting two units.

More particularly this invention relates to a trailer hitch for detachably connecting a trailer with a prime mover such as an automotive vehicle.

The hitch or coupler of this invention comprises an open ended housing having a resilient bushing seated therein. The bushing has a hole formed therethrough in communication with the open ends of the housing. Semi-cylindrical bearing sleeves are mounted in fixed position in the hole of the bushing to define together a cylindrical sleeve. A stud member is insertable in said sleeve and is provided with an integral collar portion for abutting one end of the sleeve. The stud projects through the other end of the sleeve and the projecting end receives loosely therearound a retaining washer for abutting the other end of the sleeve. A locking pin is insertable through the stud end above the washer for limiting longitudinal movement between the stud and washer. The pin is removable from the stud.

In the above construction the stud is freely rotatable about its own axis in the bearing sleeve and is tiltable in all planes relative to the housing by interparticle flow of the bushing material. The stud can be quickly uncoupled from the housing by removal of the retaining pin and by sliding of the stud through the washer and bearing sleeve.

It is then an object of this invention to provide a simple and conveniently operable coupler.

Another object of this invention is to provide a hitch for operatively connecting a trailer with an automotive vehicle.

A further object of this invention is to provide a rubber type universal joint with detachable means permitting separation of the joint elements.

A further object of this invention is to provide a trailer hitch with a resilient bushing accommodating tilting movement.

Another object of this invention is to provide locking means for a coupler that are conveniently removed when it is desired to separate the coupler elements.

Other and further objects of this invention will become apparent to those skilled in the art from the following detailed description of the annexed sheet of drawings which discloses a preferred embodiment of the invention.

On the drawing:

Figure 1 is a top plan view of a coupler or hitch according to this invention.

Figure 2 is a vertical cross sectional view taken substantially along the line II—II of Figure 1.

Figure 3 is a horizontal cross sectional view taken substantially along the line III—III of Figure 2.

As shown on the drawing:

In Figures 1, 2 and 3 the reference numeral 10 designates generally a housing having a cylindrical bore 11 therethrough and an arm 12 extending laterally from one side thereof. The housing 10 can conveniently be formed on the end of a trailer tongue 12.

The housing 10 preferably has a flange 13 formed at the top thereof defining a restricted annular opening 14 to the bore 11.

A resilient bushing such as a cylindrical rubber block 15 is seated in the bore 11 of the housing 10 with the top thereof abutting the flange 13 of the housing. The rubber bushing 15 has a cylindrical hole 16 through the center thereof coaxial with the bore 11 of the housing. The rubber bushing is preferably formed with annular grooves 17 in the top and bottom thereof between the outer and inner peripheries of the bushing. These grooves 17 facilitate interparticle flow of the rubber to accommodate tilting movements as will be more fully hereinafter described.

A fabric or metal cover 18 is molded to the outer periphery of the bushing 15 to lend body to the outer rims of the bushing defined by the outer periphery and the grooves 17 thereof.

A ring 19 is peened or spun into the bottom of the housing as at 20 for holding the bushing 15 in the bore 11. The ring 19 abuts the bottom rim of the bushing.

Segmental cylindrical bearing sleeves 21 and 22 provided with outturned flanges 23 and 24 along the longitudinal edges thereof are disposed in the opening 16 in the bushing 15 with their flanges 23 and 24 in opposed adjoining relation and seated in grooves formed in the bushing to define a cylindrical bearing sleeve coaxial with the bore 11 of the housing. The flanges 23 and 24 on the bearing sleeves 21 and 22 secure the sleeves in the bushing 15 against rotation. It should be understood, of course, that any suitable metal bearing sleeve can be used in fixed relation to the bushing 15.

The bottom ends of the sleeves 21 and 22 are bent outwardly as at 25 (Figure 2) under the rubber bushing 15.

A stud member 26 having a cylindrical portion 27, an integral collar portion 28, a tapered portion 29 and a threaded end 30 is adapted to be inserted through the housing 10 with the cylindrical portion 27 thereof in bearing engagement with the bearing sleeves 21 and 22 and projecting through the top of the housing. The collar 28 on the stud is preferably formed with a tapered bearing surface 31 for contacting the inner surfaces of the outturned portions 25 of the bearing sleeves.

The cylindrical portion 27 of the stud projecting through the top of the housing receives a washer 32 therearound. The washer 32 rests on top of the ends of the sleeves and extends over at least part of the top of the bushing 15. The stud 26 is provided with a transverse bore 33 therethrough at a point above the washer 32.
The stud 26 is also provided with a longitudinal bore 34 extending from the top of the stud into contact with the transverse bore 23. The bottom of the bore 34 is provided with an inturned bearing surface 35 for receiving a metal ball 36. A coiled spring 37 is disposed in the bore 34 above the ball 36 for urging the ball partly into the transverse bore 33. However, the bearing portion 35 of the bore 34 prevents the ball from dropping into the bore 33. A plug 38 may be secured into the top of the stud for closing the bore 34. The structure in the bore 34 therefore provides a spring pressed detent for a purpose to be hereinafter described.

A locking pin 40 is inserted through the transverse bore 33 of the stud and extends beyond the stud on each side thereof for limiting longitudinal movement of the washer 32 relative to the stud. The locking pin 40 has a rounded peripheral groove 41 intermediate the ends thereof for receiving the ball 36.

From the above description it is obvious that the locking pin 40 is insertable through the transverse bore 33 in the stud and is held in the bore by the ball 36 which is urged into the groove 41 in the pin.

One end of the pin is bent to form a leg 42 to be conveniently grasped for manipulation of the pin into and out of the bore in the stud. The leg 42 has a bore 43 therethrough for receiving the link of a chain 44. The chain 44 is threaded through an upturned ear 45 on the washer 32 and is anchored to an ear 46 formed on the arm 12 of the housing 10. Thus when the pin is withdrawn from the stud and the stud pulled through the washer out of the housing, the washer and pin will still be connected to the coupler by the chain 44. Obviously a cable, flexible wire or other holding means can be used in place of a chain.
The tapered portion 29 of the stud receives therearound the eye end 47 of a draw bar 48 connected with a prime mover such as an automotive vehicle. The threaded end 30 of the stud receives a nut 49 therearound for holding the eye 47 on the tapered portion 29.

When it is desired to uncouple the trailer having the tongue or arm 12 permanently united thereon from the automotive vehicle having the draw bar 48 permanently united thereon the locking pin 40 is merely removed from the stud 26. Since trailers usually have front legs provided with raising jacks the jacks can be operated to lift the tongue and thereby slide the housing 10 above the top of the stud 26. As a result the stud is removed from the housing and the hitch is uncoupled. The housing is permanently associated with the trailer and the stud is permanently associated with the prime mover or drawing vehicle for the trailer.
When the stud is coupled in the housing the cylindrical bearing surface 27 thereof is freely rotatable on the sleeves 21 and 22 and tilting movements of the stud relative to the housing are accommodated by interparticle flow of the material forming the bushing 15. The grooves 17 in the bushing 15 facilitate the tilting movements since the main body of bushing material between the stud and the housing is condensed in a space surrounding the tilting axis. The stud is held against movement out of the bushing by the washer and locking pin. The integral collar 31 on the stud limits the amount which the stud can be inserted into the housing.

The cylindrical portion 27 of the stud 26 may initially have a diameter greater than the inside diameter of the cylindrical bearing formed by the sleeves 21 and 22 to spread the sleeves apart so that their flanges 23 and 24 will be in spaced relation as shown in Figure 3. Then, as the cooperating bearing surfaces wear away, the sleeves are urged toward each other by the rubber bushing 15 to compensate for the wear and thus prevent looseness in the joint.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. A trailer hitch comprising a housing having a cylindrical bore therethrough, an inturned flange on one end of said bore defining a restricted annular opening thereto, a cylindrical rubber block having a cover secured to the outer periphery thereof seated in said bore in abutting relation to the flange of the housing, a ring secured in the housing for abutting the other face of the block to hold the block in the housing, annular grooves in the faces of the block adjacent the outer periphery thereof, said cover secured to the rubber block rigidifying the ends of the outer wall of the block against collapse, said block having a cylindrical bore therethrough, a bearing sleeve seated in said bore, a stud extending through said bearing sleeve and a retaining pin to hold the stud in the sleeve.

2. A trailer hitch comprising a draw bar, a cylindrical stud rigidly carried by said draw bar and extending upwardly therefrom, said stud having an integral collar portion therearound above the draw bar, the top face of said collar tapering downwardly from the stud, a trailer tongue having a housing formed on the front end thereof, said housing being open at the top and bottom thereof, a resilient rubber bushing secured in said housing having a central vertical bore therethrough, said bore having longitudinal grooves formed in diametrically opposite sides thereof, semi-cylindrical bearing sleeves seated in said bore having outturned flanges along the longitudinal edges thereof disposed in said grooves and downwardly tapered outturned flanges along the bottom thereof extending under the bushing, said stud being insertable through said sleeves in bearing engagement therewith with the tapered face of the collar thereof seated in the tapered bottom flanges of the sleeves and the top portion of the stud extending above the sleeve, a washer loosely disposed around the top portion of the stud for abutting said sleeve, the portion of the stud above the washer having a transverse bore therethrough and a locking pin insertable through said bore to hold the washer on the stud for maintaining the stud in the sleeve whereby the stud can rotate freely about its own axis in the sleeve and can tilt relative to the housing due to interparticle flow of the bushing material.

3. A trailer hitch comprising a trailer tongue having an eye end, a resilient rubber bushing secured in said eye end, said bushing having a vertical bore through the central portion thereof, a bearing sleeve secured in said bore, a draw bar, a cylindrical stud rigidly secured to the end of the draw bar and extending upwardly therefrom, said stud adapted to be inserted through said sleeve in bearing engagement therewith and having an integral collar portion therearound for abutting the bottom end of the sleeve, a washer loosely disposed around the portion of the stud projecting above the sleeve and abutting the top of the sleeve, said washer having a turned-up apertured ear portion formed along the outer periphery thereof, said portion of the stud above the washer having a transverse bore therethrough, said top portion of the stud having a longitudinal bore therein provided with a reduced bottom portion communicating with the transverse bore, a metal ball in said longitudinal bore adapted to be seated on the reduced portion thereof and extend into the transverse bore, a spring in said longitudinal bore urging the ball into the transverse bore, a closure plug above said spring for sealing the longitudinal bore and for holding the spring under compression in the bore, a locking pin insertable through the transverse bore and having an annular groove formed intermediate the ends thereof for receiving the ball therein, and a chain threaded through said ear of the washer and secured to the locking pin at one end thereof and to the trailer tongue at the other end thereof.

GEORGE H. HUFFERD.